US007756513B2

(12) United States Patent
Smith

(10) Patent No.: US 7,756,513 B2
(45) Date of Patent: Jul. 13, 2010

(54) COMMAND AND CONTROL COMMUNICATIONS SYSTEM WITH SUB-NETWORKS AND INTERFACE DEVICES

(75) Inventor: Wesley D. Smith, Upper Marlboro, MD (US)

(73) Assignee: ARINC Incorporated, Annapolis, MD (US)

( * ) Notice: Subject to any disclaimer, the term of this patent is extended or adjusted under 35 U.S.C. 154(b) by 1778 days.

(21) Appl. No.: 10/879,013

(22) Filed: Jun. 30, 2004

(65) Prior Publication Data

US 2006/0002372 A1 Jan. 5, 2006

(51) Int. Cl.
*H04L 29/06* (2006.01)
(52) U.S. Cl. .............. 455/414.3; 370/352; 370/353; 370/354; 370/355; 370/356; 379/45; 379/49; 379/219; 379/224; 455/414.1; 455/414.2; 455/456.3; 455/426.1; 455/552.1; 709/201; 709/202; 709/203
(58) Field of Classification Search ......... 370/351–356, 370/395.52; 455/414.1–414.4, 404.1, 456.1–456.3, 455/426.1, 426.2, 427, 552.1, 554.2, 555; 379/45–49, 219, 224; 709/201–203; 701/200–226
See application file for complete search history.

(56) References Cited

U.S. PATENT DOCUMENTS

| | | | |
|---|---|---|---|
| 6,377,374 B1 * | 4/2002 | Davis et al. .......... 398/82 |
| 6,477,166 B1 * | 11/2002 | Sanzi et al. .......... 370/395.1 |
| 6,571,092 B2 * | 5/2003 | Faccin et al. .......... 455/404.1 |
| 6,618,378 B1 * | 9/2003 | Giroux et al. .......... 370/395.1 |
| 6,725,401 B1 * | 4/2004 | Lindhorst-Ko .......... 714/47 |
| 6,728,484 B1 * | 4/2004 | Ghani .......... 398/42 |
| 6,775,534 B2 * | 8/2004 | Lindgren et al. .......... 455/404.1 |
| 6,819,929 B2 * | 11/2004 | Antonucci et al. .......... 455/445 |
| 6,990,329 B2 * | 1/2006 | Deinzer .......... 455/404.1 |
| 7,142,786 B2 * | 11/2006 | Moursund et al. .......... 398/118 |
| 7,170,852 B1 * | 1/2007 | Adler .......... 370/223 |
| 2001/0021646 A1 * | 9/2001 | Antonucci et al. .......... 455/404 |
| 2002/0167954 A1 * | 11/2002 | Highsmith et al. .......... 370/406 |
| 2003/0117950 A1 * | 6/2003 | Huang .......... 370/220 |
| 2008/0153454 A1 * | 6/2008 | Haapapuro et al. .......... 455/404.1 |

OTHER PUBLICATIONS

Harry Newton, Newton's Telecom Dictionary, Feb. 2000, Telecom Books, 16th edition, p. 530.*

* cited by examiner

*Primary Examiner*—Hemant Patel
(74) *Attorney, Agent, or Firm*—Oliff & Berridge, PLC

(57) ABSTRACT

A sub-network device and a method of communicating using a sub-network, interconnect device and a network as a backbone within a communications system includes receiving a request for information at the interconnect device from a wireless communications device to communicate with the interconnect device, the interconnect device interconnects the wireless communications device to the sub-network, transmitting the request for information from the wireless communications device to the network, the network including terrestrial communications and being connected to a public safety agency network, receiving the requested information at the sub-network from the public safety agency network over the network in response to the transmitted request for information and transmitting the requested information back to the wireless communications device through the interconnect device.

14 Claims, 3 Drawing Sheets

COMMAND AND CONTROL COMMUNICATIONS SYSTEM WITH SUB-NETWORKS AND INTERFACE DEVICES

BACKGROUND OF THE INVENTION

1. Field of Invention

The invention relates to communications systems. More specifically, the systems of the invention allow users to access, command and control voice, data and video information through an integration of wireless and terrestrial communications networks.

2. Description of Related Art

World events have changed the manner in which government and private agencies communicate and access information through communications networks and systems. Some of these agencies are public safety agencies which are known as "first responders" because they are the first to respond to emergency situations. For example, first responders may be the first to act in response to emergency situations caused by a terrorist attack, fires or meteorological catastrophes. After these tragic events occur, there can be critical communication lapses between first responders using, for example, wireless and terrestrial communications because inadequate systems are in place. As a result, there are existing communications problems between first responders and other agencies when they work together after a tragic event. Federal, state and local governments operate in a less than an optimum capacity primarily due to ineffective communications. For example, the newly formed Department of Homeland Security (DHS) is an agency that needs to communicate critical information with first responders when tragic events occur.

Conventional communications systems used by first responders have interoperable technologies which integrate some communications systems, for example, radio communications and an audio mixer. For example, an audio mixer may mix audio from desperate radio systems thus enabling cross communications. However, these systems have strict limitations on the type of network equipment that can be used in order to interoperate and allow first responders to communicate using various devices and networks. For example, video and data is currently not fully integrated into conventional communications systems utilized by first responders because the systems are not interoperable. Thus, the conventional systems are severely limited in the types of information that can be exchanged by first responders over the devices and networks.

SUMMARY OF THE INVENTION

Thus, there is a need for communications systems and methods that will allow improved interoperability of networks for the first responders. There are approximately 73,000 public safety agencies as first responders that could highly benefit from an improved communications system using an interoperable communication architecture that integrates, for example, radio, terrestrial, satellite and cellular communications to solve information and network interoperability limitations.

A sub-network device and a method of communicating using a sub-network, interconnect device and a network as a backbone within a communications system includes receiving a request for information at the interconnect device from a wireless communications device to communicate with the interconnect device, the interconnect device interconnects the wireless communications device to the sub-network, transmitting the request for information from the wireless communications device to the network, the network including terrestrial communications and being connected to a public safety agency network, receiving the requested information at the sub-network from the public safety agency network over the network in response to the transmitted request for information and transmitting the requested information back to the wireless communications device through the interconnect device.

A sub-network device connected to a backbone network within a communications system includes a first interconnect device that is connected to wireless communications, a second interconnect device that is connected to terrestrial communications and a network manager that includes a controller that controls the sub-network to receive a request for information through the first interconnect device from a wireless communications device, transmit the request for information to a government agency through the backbone network, receive the requested information at the sub-network through the backbone network and transmit the requested information through the first interconnect device to the wireless communications device.

BRIEF DESCRIPTION OF THE DRAWINGS

Various exemplary embodiments of the systems and methods according to this invention will be described in detail, with reference to the following figures, wherein.

DETAILED DESCRIPTION OF PREFERRED EMBODIMENTS

The invention allows users to access, command and control voice and data information over a communications system 100, for example, through an integration of wireless and terrestrial communications networks using Internet Protocol (IP) and Voice over IP technology (VOIP).

Figure 1:
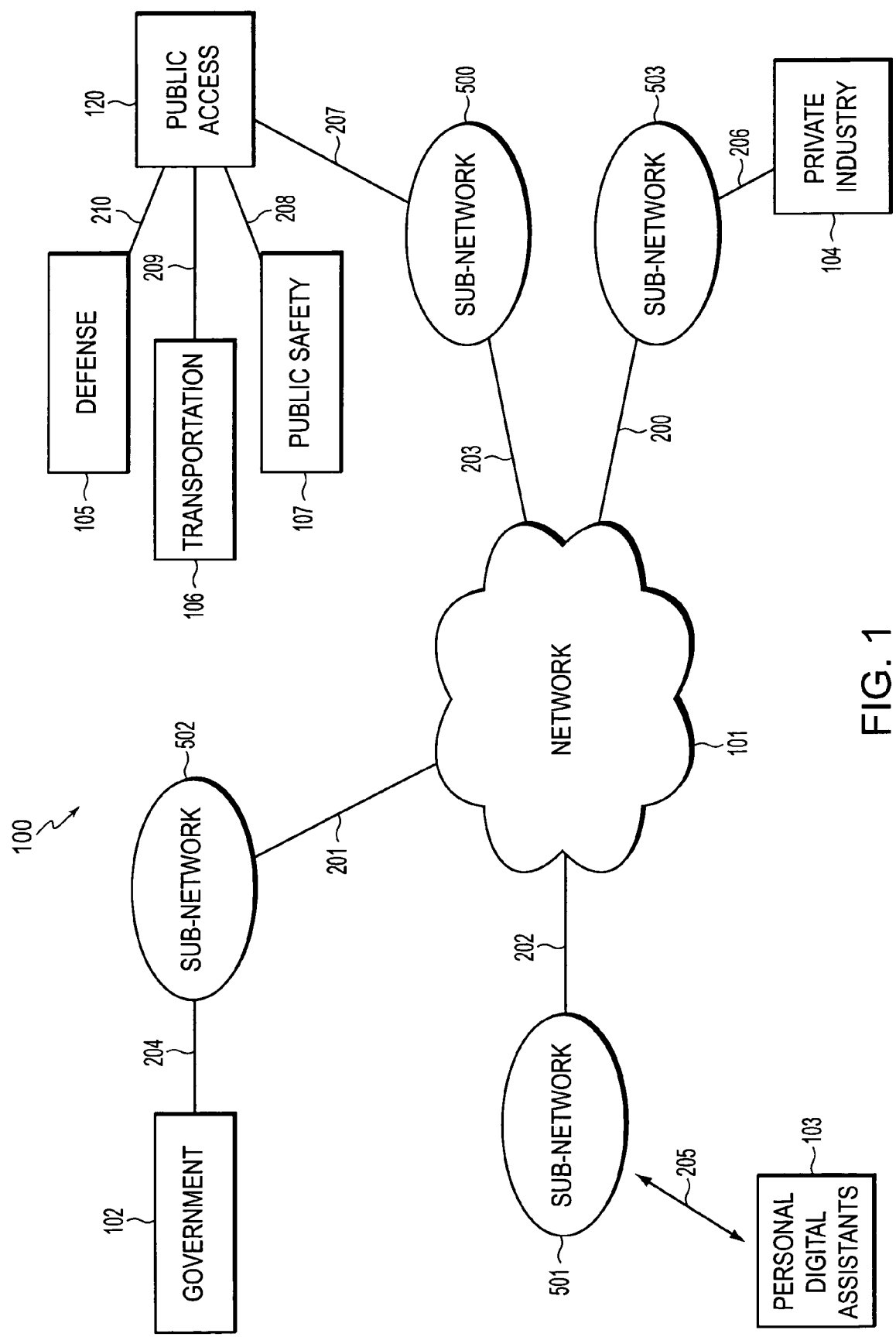
FIG. 1 is an exemplary block diagram of the communications system in accordance with the invention.

FIG. 1 is an exemplary block diagram of the communications system 100 in accordance with the invention. As shown in FIG. 1, the system 100 includes a network 101, sub-networks 500-503, and communication devices 102-107. The network 101 may function as a backbone for the communications system 100. The network 101 may be a single network or a plurality of networks of the same or different types. For example, the network 101 may include the local telephone network of a Local Exchange Carrier in connection with the long distance network of an Interexchange Carrier (such as the AT&T long distance telephone network). Further, the network 101 may be a data network alone or in combination with a telecommunications network. Any combination of communications and data networks may be used without departing from the spirit and scope of the present invention. The network 101 may also be an existing terrestrial backbone network used by a company, for example, a fully meshed, geographically diverse, four node IP and Asynchronous Transmission Mode (ATM) backbone with redundant circuits and equipment at each core site. One example of an existing network that can be used as a back bone network with these features is ARINC's global network (AGN). In this example, routers may provide the central routing of IP packets and switches may provide fast Ethernet switching for the first responders. This type of backbone network may support an architecture for voice, video and integrated data. For the purposes of discussion, it will be assumed that the network is this type of network.

Connected to the network 101 through communications links 200-203 are a plurality of sub-networks 500-503. The sub-networks 500-503 can act as gateways to the network 101 and may allow, for example, first responders 102-107 to communicate with each other or other entities through communications links 204-210. For the purposes of discussion, the first responders 102-107 can include federal, state, and local government entities, private industry entities, first responders that use personal digital assistants (PDAs) and first responders such as defense, transportation and public safety entities that may access the network 101 through a public access gateway 120. Each sub-network 500-503 may be enabled with VOIP that serves as the interface to the network 101.

The communication links 200-203 (and the communications links of the invention throughout the description) may be any type of connection that allows for the transmission of information. Some examples include conventional telephone lines, digital transmission facilities, fiber optic lines, direct serial/parallel connections, cellular telephone connections, satellite telecommunication links, radio frequency (RF) links, local area networks (LANs), Intranets and the like.

The communications system 100 may also use a variety of wireless and terrestrial access methods to connect the sub-networks 500-503 together using, as discussed above, voice, video and integrated data as a core of operating systems. This architecture may enable network interoperability, for example, of wireless local area networks (WLAN), land mobile radio (LMR) networks, cellular networks, satellite communications and mobile communications. Because the communications system 100 may use standards base IP, applications such as those used for command and control, communications alerts and messaging are easily integrated into the communications system. The result is a communications system 100 that may allow utilization of existing infrastructures with an open, IP-based solution, thereby significantly reducing costs of implementing a communications system, and ongoing service and support.

Figure 2:
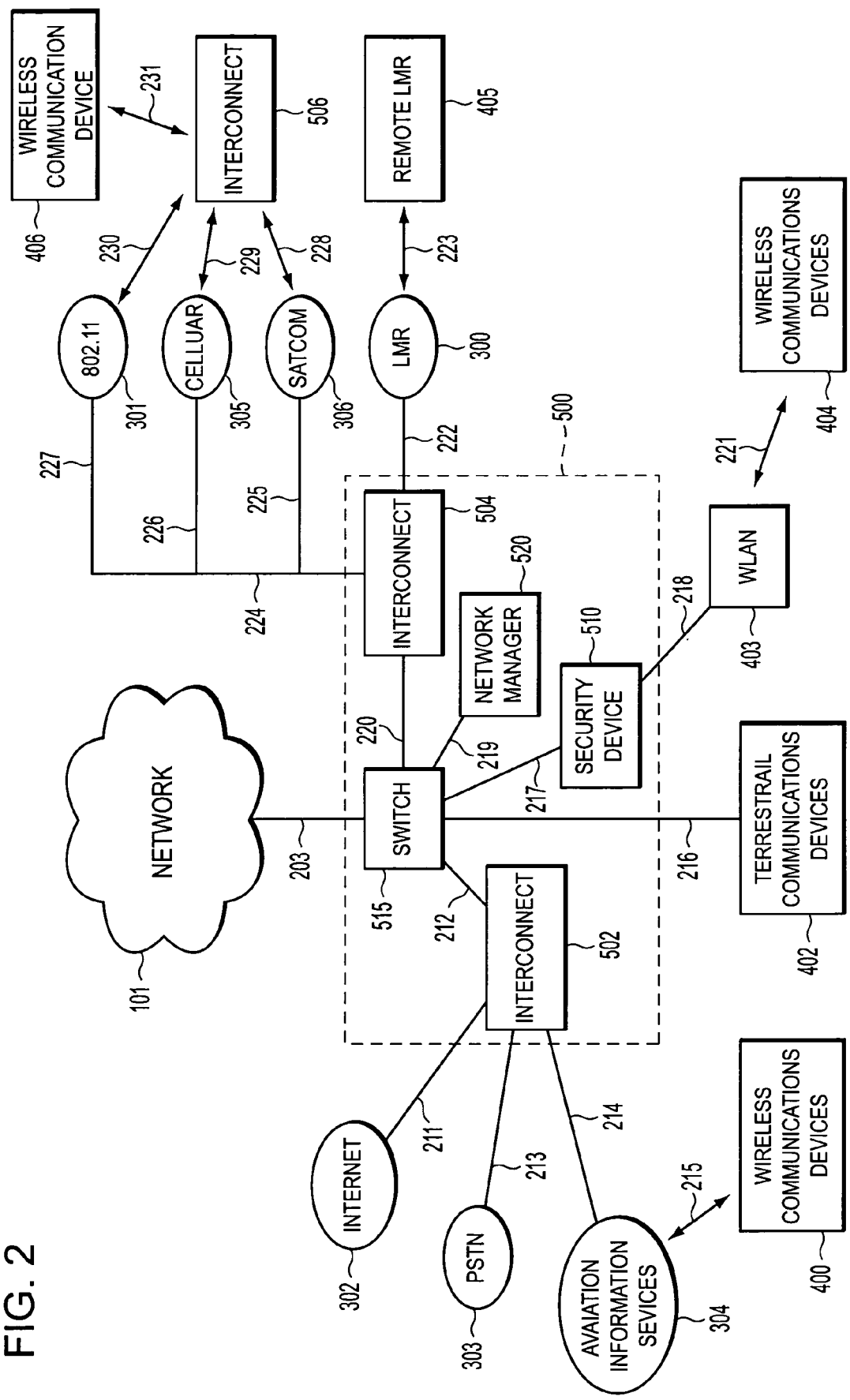
FIG. 2 is an exemplary block diagram of the sub-networks and interconnect devices of the communications system in FIG. 1.

FIG. 2 is an exemplary block diagram of the sub-networks 500-503 and of the communications system in FIG. 1. A sub-network may exist for each first responder in addition to public safety and airport networks. As shown in FIG. 2, a sub-network 500 may include a switch 515. The communications between the network 101, the sub-network 500 and the various communications services and devices discussed below may occur through communications links 203 and 211-230. The switch may filter and forward data packets between the network 101 and sub-network 500. The switch may be connected to interconnect devices 502 and 504, a security device 510 and a network manager 520. A terrestrial communications device 402 may also be connected to the switch 515. The interconnect devices 502 and 504 may function as gateways to allow a bridge between the network 101 and, for example, the WLAN 403, cellular network 305, satellite communications 306 and/or terrestrial communications, such as the public switched telephone network (PSTN) 303, the Internet 302 and/or aviation information services 304, such as aviation networks that provide data communications, message-switching and content services through aviation industry companies, trading partners, service providers and government agencies world-wide.

Users of the communications system 100 may exchange information ranging from Passenger Name Records (PNRs), seat availability status, air waybills, aircraft movement and material management transactions. The distributed architecture may connect the sub-networks 500-503 using a variety of gateway equipment. For example, mobile IP may be used in a remote interconnect device 506 and the wireless communications devices 406 for roaming the sub-networks 500-503. The security device 510 may include, for example, IP security protocols (IPSec), virtual private network (VPN) or a static wireless equivalency privacy (WEP). IPSec may be used for WLAN applications requiring high security such as those for government and public safety and it uses an encryption algorithm.

Mobile IP may allow a first responder using the wireless communications device 406 and remote interconnect device 506, for example, installed in an automobile to seamlessly communicate with another first responder or agency using various types of wireless and terrestrial communications. Moreover, utilizing mobile IP for the interconnect device 506 may allow the use of an IP enabled mobile remote point-of-presence (RPOP) in motion which is capable of interfacing to the network 101 using the cellular network 305, satellite communications 306 and 802.11 wireless access technologies 301. A radio frequency (RF) interconnect switch may be used to allow a two-way radio, i.e., a remote LMR 405 to interconnect to the satellite communications 306, cellular network 305 and and/or the sub-networks 500-503 as VOIP networks.

The WLAN 403 may be used in many environments including offices, airports, and entertainment centers such as malls, and amusement parks. The WLAN 403 technology may include the Institute of Electrical and Electronic Engineers (IEEE) 802.11b which operates in the 2.4 GHz frequency at 11 MBPS. The communications system 100 may include the capability to interface to a variety of cellular vendors. The cellular network 305 may include communications, such as voice, video and data interoperability over multiple digital cellular technologies including Global System for Mobile Communications (GSM), Code-Division Multiple Access (CDMA) and Personal Communications Services (PCS). Furthermore, a variety of digital cellular services and enhancements may be used such as Short Message Services (SMS) Gateways and wireless applications (using Wireless Application Protocol (WAP)) so that the cellular needs of the first responders can be satisfied.

The first responders may also use LMR communications 300 especially because radio has many advantages over terrestrial, cellular and satellite communications. For example, radio communication is mobile, and the cost of radio communication is half of cellular wireless services. LMR includes the ability for a first responder to customize a radio system to the needs of a the first responder (including interconnects, mobility and security). The communications system 100 may interface to a variety of satellite vendors including Global Star, INMARSAT, and MotoSAT, as well as applications that utilize the Global Positioning System (GPS) for tracking and mapping. Each vendor provides a variety of different services. Satellite communications services may compensate for limitations with cellular communications which include line of sight and saturated frequencies.

Figure 3:
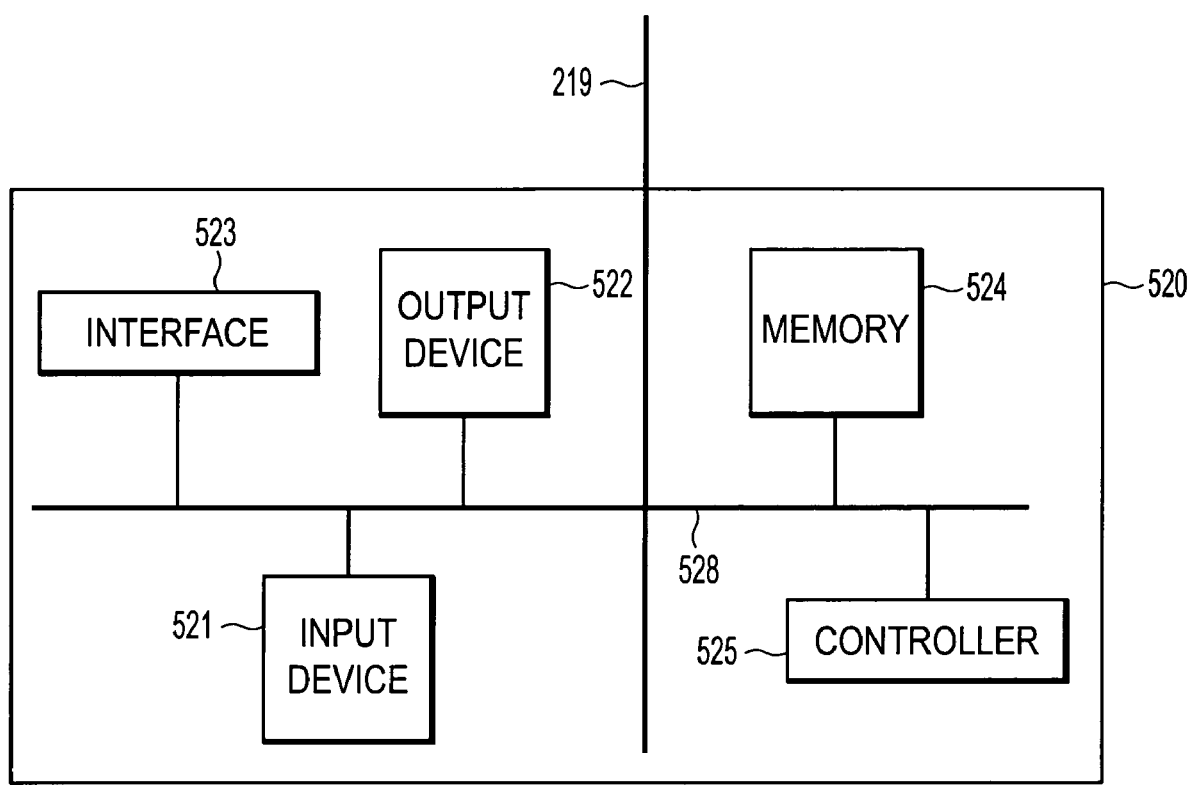
FIG. 3 is an exemplary block diagram of a network manager used in accordance with the invention.

FIG. 3 is an exemplary block diagram of a network manager 520 in accordance with the invention. The network manager 520 may be connected via link 219 to the switch 515 in the sub-network 500, and can be used to monitor the sub-network and/or control messages, alarms, information or data tracking. As shown in FIG. 3, the network manager 520 may include an input device 521, output device 522, interface 523, memory 524, and a controller 525. The devices 521-525 may be connected via a bus 528.

The input device may be any device may allow commands to be inputted into the network manager 520 so that the communications system 100 can be controlled. The output device 522 may be any device that allows, for example, images to be recorded on a medium or shown on a display. The memory 524 may be any device that allows information to be stored. The interface 523 allows the devices 521-525 to communicate with each other and with various devices within the communications system 100.

In the illustrated embodiment, the controller 525 may be implemented with a general purpose processor. However, it will be appreciated by those skilled in the art that the controller 525 may be implemented using a single special purpose integrated circuit (e.g., ASIC) having a main or central processor section for overall, system-level control, and separate sections dedicated to performing various different specific computations, functions and other processes under control of the central processor section. The controller 525 may be a plurality of separate dedicated or programmable integrated or other electronic circuits or devices (e.g., hardwired electronic or logic circuits such as discrete element circuits, or programmable logic devices such as PLDs, PLAs, PALs or the like). The controller 525 may be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller 525. A distributed processing architecture can be used for maximum data/signal processing capability and speed.

As an example of operation of the communications system 100, a local government may have a hazardous material (HAZMAT) emergency that requires communication between first responders, such as the police, fire and rescue departments. In addition, the Federal Emergency Management Agency (FEMA) would need to be notified and would participate in the response. The first responders may use the LMR 300, remote LMR 405 and the interconnect device 504 as a bridge between each other even when each department operates on different frequencies. FEMA may also communicate with the police, fire and rescue departments by using PSTN 303 communication which is connected to the interconnect device 502 via communication link 213. Thus, the first responders could more efficiently deal with the HAZMAT emergency using the communications system 100.

A user of the communications system 100 can also use the WLAN 403 to communicate to a first responder or an agency when the WLAN 403 is coupled with wireless Internet services providers (WISPs). This configuration may allow travelers to use their laptops and PDAs to browse the Internet while waiting for their flight in an airport. In addition, aviation information services subscribers may have access to specific aviation information utilizing the communications system 100.

Another example of operation of the communications system 100 will be provided in a scenario where a suspected terrorist is spotted by an airport security official as the suspected terrorist is attempting to board a plane at the airport. The security official may use a cellular telephone as the wireless communication device 406 (through the cellular network 305) as part of the communications system 100 to send a request for and receive information related to passengers in the airport from the Federal Bureau of Investigation (FBI) headquarters. The security official uses the wireless communication device 406 to access the sub-network 500 through the interconnect 506 and the service (802.11, cellular, SATCOM, etc.) associated with the wireless communication device 406 of the security official. By using the interconnects 506 and 504, the security official may be connected through link 220, switch 515 and link 203 to the backbone network 101. The FBI's network would use, for example, sub-network 502 (FIG. 1) as a government agency 102 to access the communications system 100 through links 204 and 201.

An user or computer system at the FBI headquarters may receive the request from the security official and provide a response to the request that the security official may receive on his cellular telephone. For example, PNRs or information from the FBI 102 may include a picture of the suspected terrorist in the airport. The security official may receive the information about the suspected terrorist while in motion either using a PDA, cellular telephone or laptop computer so that he would not lose contact with the suspected terrorist. Using this information, the security official could identify and confirm the suspect as a known terrorist, and subsequently make an arrest quickly and without further jeopardizing the hundreds of additional passengers in the airport. Moreover, at an airport facility, Transportation Security Agency (TSA) employees may communicate quickly and responsively with, for example, the Department of Homeland Security in response to incidents requiring multi-jurisdiction communication using the communications system 100 similarly in the scenario discussed above and using various types of wireless and terrestrial communication devices. The TSA employees may also have access to the aviation information services 304 network as discussed above.

As yet another example of operation of the communications system 100, a first responder, such as a government official 102 may use satellite communications 306 as backup communications so that it can more effectively maintain communications with other first responders during an emergency situation.

As yet another example of operation of the communications system 100, a local emergency may occur within a local government jurisdiction in which an officer driving a police car is in motion and out of range of terrestrial and 802.11 WLAN communications 301. In this scenario, the officer may desperately need to communicate to a official from a particular federal agency, such as the Federal Emergency Management Agency (FEMA), either using a data network or voice communication. The officer may also need to access a FEMA database or transmit information to the FEMA official.

Using the wireless communication device 404 and the WLAN network 403 configured through equipment within the police car, the police officer may dynamically communicate with the FEMA official using, for example, the LMR communications 300, interconnect 504, switch 515 and links 203, 220, 222 and 223 to access the backbone network 101 and the FEMA network. Furthermore, if the police officer used the wireless communications device 406 and the interconnect 506, the police officer may use any one of wireless communications, i.e., 802.11, cellular, SATCOM, etc., to access the network 101 through links 224-227, the sub-network 500 and link 203. This configuration may allow the police officer to instantly communicate with the FEMA official even while the police car is in motion.

As yet another example of operation of the communications system 100, a terrorist attack may occur in a state jurisdiction that involves the communication coordination of multiple first responders, i.e., public safety jurisdictions like the fire department, police department, rescue department, etc. Conventional technology that the first responders currently use includes different modes of communication that is used by all jurisdictions, for example, using VHF and UHF radio, LMR, terrestrial communications and cellular networks. The major communication problems previously discussed prevent the multiple first responders from communicating with each other during the terrorist attack because the multiple first responders all have different communication systems that require interoperable communications to communicate with each other. However, by using the communications system 100 including the backbone network 101, the multiple first responders may each communication with each other using sub-networks 500-503, the interconnect devices 502, 504 and 506, and the various types of communication. Furthermore, the network manager 520 may manage call processing to statically and dynamically establish broadcast groups, closed user groups and user profiles using a combination of radio switching and matrices and highly skilled and trained operators.

As yet another example of operation of the communications system 100, an airport in the U.S. can use the communications system 100 to include a WLAN 403 for both public and private access. For example, the WLAN can include a public access so that passengers can browse the Internet while waiting for their flight, and private access so that airline personnel can use the network 101 for operational or emergency services. The airline personnel as the private users may access private applications while allowing passengers to access public services such as the Internet.

In various exemplary embodiments (especially in Federal government WLAN installations), information encryption may be necessary. Thus, the communications system 100 may incorporate encryption devices and methods. Moreover, a concentrator may be used to establish a point-to-point tunnel from a remote wireless user. All traffic is may then be routed to the concentrator. For example, two types of concentrators may used in the communications system. A mobile concentrator may be used to switch from satellite to cellular wireless mediums without re-establishing the tunnel.

Using a combination of encryption, scrambling software and hardware, and third-party enhancements, radio or wireless communications may be equipped to provide secure data and voice transmissions. In various alternative exemplary embodiments, the communications system 100 may allow many wireless applications and devices to be used over its architecture. These applications may include, for example, devices used with existing back-bone networks and commercial-off-the-shelf (COTS) applications.

Because the communications system 100 may also use standards base IP applications such as those used for command and control, communications alerts and messaging may be easily integrated into the communications system 100. The result is a communications system that allows utilization of existing infrastructures with an open, IP-based solution, thereby significantly reducing costs of implementing a communications system, and ongoing service and support. The communications system may include an architecture that integrates first responders' wireless networks, services and interconnect devices, to a terrestrial backbone communications network. It should be appreciated by one skilled in the art that wireless networks, services and interconnect devices may include LMR networks, 802.11 WLANs, cellular networks and satellite communication.

While the invention has been described in conjunction with exemplary embodiment, these embodiments should be viewed as illustrative, not limiting. For example, the multi-function device may be replaced by a dynamic configuration of imaging devices, and associated hardware and software resources. Various other modifications, substitutes, or the like are possible within the spirit and scope of the invention.

What is claimed is:

1. A method of communicating using a sub-network, interconnect device and a network as a backbone within a communications system, comprising:

receiving a request for information at the interconnect device from a wireless communications device to communicate with the interconnect device, the interconnect device interconnects the wireless communications device to the sub-network;

transmitting the request for information from the wireless communications device to the network, the network including terrestrial communications and being connected to a public safety agency network;

receiving the requested information at the sub-network from the public safety agency network over the network in response to the transmitted request for information; and transmitting the requested information back to the wireless communications device through the interconnect device, wherein the network is a fully meshed, geographically diverse, four node Internet Protocol and Asynchronous Transmission Mode network, the interconnect device is connected to mobile radio communications, satellite communications, cellular communications and 802.11b wireless communications, and the mobile radio communications, satellite communications, cellular communications and 802.11b wireless communications are connected to a remote interconnect device installed in an automobile so that the sub-network can receive the request for information from the wireless communications device in the automobile using a land mobile radio while the automobile is in motion.

2. The method of claim 1, further comprising the requested information being information related to a tragic event or emergency situation and the information is requested by one of at least a police, fire and rescue official.

3. The method of claim 2, further comprising receiving the request originating from one of at least cellular communication, satellite communication and 802.11 wide area network communication.

4. The method of claim 1, further comprising the request for information originating from a first responder that includes one of at least a federal, state, and local government official.

5. The method of claim 3, further comprising transmitting the request for information to a second interconnect device that further transmits tilt request to one of at least an Internet and a public service telephone network.

6. The method of claim 1, further comprising the sub-network including a security device so that access to the sub-network is only granted to authorized users.

7. The method of claim 1, further comprising the sub-network using Internet Protocol and Voice over Internet Protocol technology to communicate.

8. The method of claim 1, further comprising the requested information including one of at least aircraft passenger name records, aircraft seat availability status, air waybills, aircraft movement and material management transactions.

9. The method of claim 1, further comprising receiving the request for information through satellite communications as a backup communication when primary communications become inoperable.

10. The method of claim 1, further comprising receiving the request for information through an Internet Protocol enabled point-of-presence that interfaces with the network, and the wireless communications being one of at least radio communications, satellite communications and 802.11b wireless communications.

11. The method of claim 1, further comprising receiving the request for information at the sub-network from a first wireless communications device operating on a first frequency, transmitting the request for information from the sub-network to another a second wireless communications device operating on a second frequency, receiving the requested information at the sub-network from the second wireless communications device operating on the second frequency and transmitting the requested information back to the first communications device operating on the first frequency.

12. The method of claim 1, wherein the sub-network establishes one of at least a broadcast group closed user group after receiving the request for information.

13. A sub-network device connected to a backbone network within a communications system, comprising:
 a first interconnect device that is connected to wireless communications;
 a second interconnect device that is connected to terrestrial communications; and
 a network manager that includes a controller that controls the sub-network device to receive a request for information through the first interconnect device from a wireless communications device, transmits the request for information to a government agency network through the backbone network, receives the requested information from the government agency network at the sub-network device through the backbone network and transmits the requested information through the first interconnect device to the wireless communications device,
 wherein the backbone network is a fully meshed, geographically diverse, four node Internet Protocol and Asynchronous Transmission Mode network, and the first interconnect device allows the wireless communications device to communicate with a wireless local area network device that uses a land mobile radio in an automobile while the automobile is in motion.

14. The sub-network device of claim 1, further comprises the second interconnect device being connected to an Internet, public switched telephone network and aviation service network.

* * * * *